Dec. 18, 1962 R. J. WEBER 3,068,658
VENTING VAPOR APPARATUS
Filed June 19, 1961
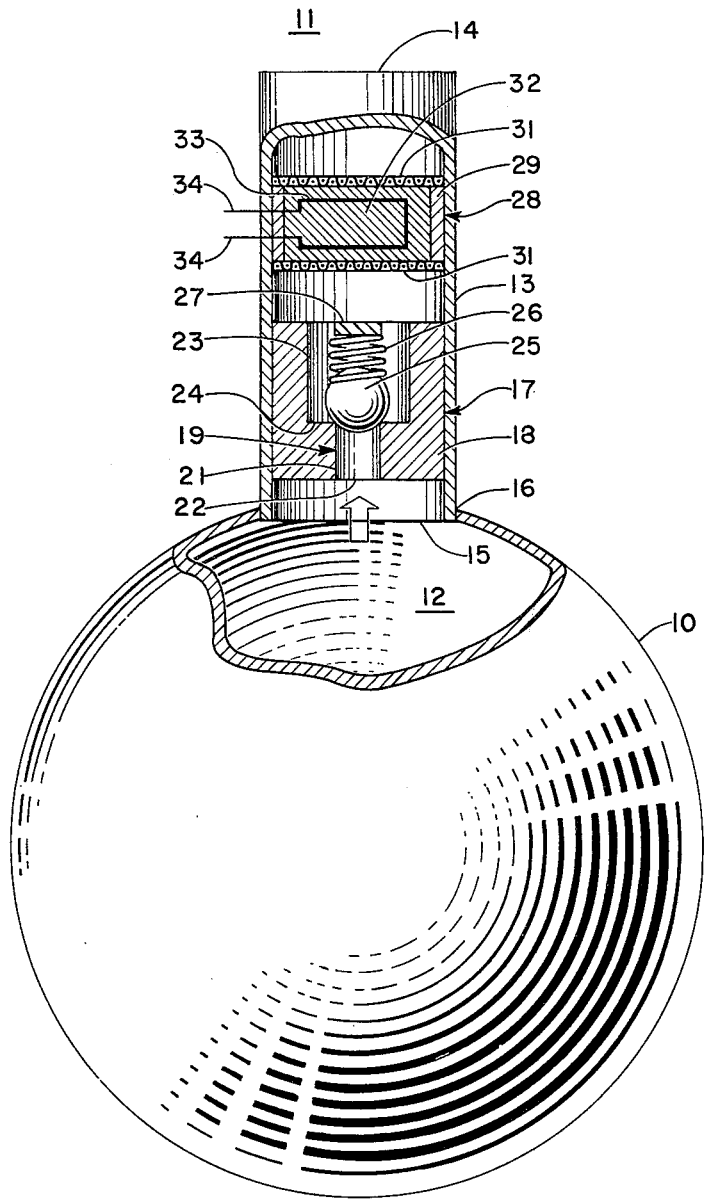
INVENTOR
RICHARD J. WEBER
BY
ATTORNEY

United States Patent Office 3,068,658
Patented Dec. 18, 1962

3,068,658
VENTING VAPOR APPARATUS
Richard J. Weber, Cleveland, Ohio, assignor to the United States of America as represented by the National Aeronautics and Space Administration
Filed June 19, 1961, Ser. No. 118,200
5 Claims. (Cl. 62—50)
(Granted under Title 35, U.S. Code (1952), sec. 266)

The invention described herein may be manufactured and used by or for the Government of the United States of America for governmental purposes without the payment of any royalties thereon or therefor.

The present invention relates generally to a tank pressure-relief device and, more particularly, to an apparatus for venting cryogenic liquid vapors.

Most space mission vehicles, that is extra-terrestrial flight of manned or unmanned craft, utilize a combination of propellants such as fluorine, oxygen and hydrogen for providing maximum impulse so as to obtain maximum payload-carrying capacity for a given total space vehicle weight. These propellants, gaseous under atmospheric temperature and pressure conditions, are transformed into cryogenic liquids by cryogeny in order to obtain maximum density, thereby holding propellant tank weight and size to a minimum. Although no difficulty with the aforementioned liquefied propellants is encountered when space missions of a short duration are undertaken, a serious problem develops as space mission time is increased, as for example, when rendezvous orbits or interplanetary coasting periods become necessary, in that unavoidable heating of the cryogenic propellant tank resulting from extraneous sources, such as the sun or planets, vaporizes a part of the propellants. As the propellants undergo a change of state from the liquid to a gas in the closed system of the space vehicle propellant tank, a pressure rise occurs within the propellant tank which increases in magnitude with increasing propellant vaporization. Ultimately, if unchecked, the pressure buildup exceeds the design stresses of the propellant tank, thereby causing tank rupture. Consequently, it is necessary in order to prevent tank rupture, and hence abortion of the space mission, to discharge or vent the vaporized liquid. However, under zero-g-conditions, which is the norm in interplanetary travel or other space missions, vaporized cryogenic fluid location may not be known in advance. Thus, the probability is ever present that a large part of the cryogenic liquid propellants will also be discharged if a conventional venting valve arrangement is employed. Quite obviously, such an arrangement is undesirable.

One proposed technique of surmounting the problem provides for the localization of all of the vapor in a known area before venting, such as by spinning the entire vehicle or the propellant tanks. This arrangement, however, suffers from many shortcomings, such as auxiliary requirements to provide for spinning and added vehicle complexity. Another contemplated technique is to separate the vapor from the liquid at the venting location by centrifugal pumps or mechanical filters. This particular technique, however, involves devices which are unreliable and inefficient. In addition, both of the aforementioned techniques involve the addition of a large amount of weight to the space vehicle. Obviously, this is highly undesirable inasmuch as every pound added to the space vehicle weight results in a like reduction of payload weight.

Accordingly, it is an object of this invention to provide a new and improved device for preventing excessive pressure rises in cryogenic liquid containers resulting from cryogenic liquid vaporization.

Another object of the instant invention is to provide a reliable apparatus for the sensing and venting of a contained vaporized cryogenic liquid.

Still another object of the invention is to provide a simple lightweight apparatus for sensing and discharging contained cryogenic liquid vapors.

A further object of the present invention is to provide a self-contained automatic unit for detecting and venting a contained vaporized cryogenic liquid.

A still further object of the instant invention is to provide a continuously usable vent for discharging contained cryogenic liquid vapors.

According to the present invention, the foregoing and other objects are obtained by venting a cryogenic fluid-containing tank through strategically-placed tubes having a porous plug and valve secured therein. The valve is adapted to open upon being subjected to a predetermined tank pressure, thereby permitting the flow of cryogenic fluid through the porous plug. While passing through the porous plug, the cryogenic fluid undergoes a constant-enthalpy expansion process, thereby permitting vapors to freely escape and effecting freezing of non-vapors.

A more complete appreciation of the invention and many of the attendant advantages thereof will be readily apparent as the same becomes better understood by reference to the following detailed description when considered in connection with the accompanying drawing wherein a schematic illustration, partly in section, of one embodiment of the invention is shown.

Referring now to the drawing a spherical container or tank 10 is disclosed located in a space environment 11 enclosing a cryogenic fluid 12 such as fluorine, oxygen, hydrogen or the like, and having a circular conduit or discharge tube 13 vertically affixed thereto. The discharge tube 13 which includes an outer portion 14 serving as a cryogenic fluid exit and an inner portion 15 serving as a cryogenic fluid inlet is positioned on the tank 10 such that the inner portion 15 is exposed to the cryogenic fluid 12 through an aperture 16 formed in the tank 10. A valve mechanism 17 is secured within the tube 13 across the cross section thereof near the lower portion 15. This valve mechanism 17 comprises, as shown, a cylindrical liner 18 having a single cylindrical passage 19 the entire length thereof. The passage 19 consists of a small diameter cylindrical orifice 21 having the lower end 22 thereof exposed to the cryogenic fluid 12 connected to a larger diameter cylindrical orifice 23 midway in the liner 18, thereby forming a seat 24 for a ball 25. A spring 26 acts between the ball 25 and a spring-retaining cross member 27 for urging the ball toward the seat 24, thereby effecting positive sealing of the passage 19. Although all components of the valve mechanism may be of a material such as fabricated stainless steel or the like, it is preferred that the liner be made out of a material having excellent thermal conductivity characteristics such as a copper alloy, or the like, for a purpose to be hereafter explained and a sufficient hardness so as not to deform under the urging of the ball. Obviously, however, any valve may be used which is able to maintain operability with cryogenic temperatures.

A porous plug assembly 28 is disposed within the tube 13 across the entire cross section thereof between the outer portion 14 and the valve mechanism 17. The plug assembly 28 is comprised of a circular ring or band 29 having a screen 31 or other retaining device affixed to each end thereof. A porous plug 32 fabricated of a material such as a metal, ceramic, or plastic having porous characteristics, such as for example, steel wool is disposed between the screens 31 and is contained thereby to prevent movement along the vertical axis of tube 13. The plug 32 is provided with a heating element 33 of the resistance type for a purpose to be hereafter explained. The heating element 33 is provided with conductors 34 for connection to an energy source (not shown).

In the operation of the device, the resulting pressure rise within the tank 10 from partial vaporization of the cryogenic fluid due to heat leaks into the tank exerts a pressure force on both the tank internal wall and the ball 25 which is exposed to the cryogenic fluid through the lower end 22 of the small diameter orifice 21. The spring 26 urges the ball 25 against the seat 24, thus sealing the liner passage 19 until the tank pressure reaches a predetermined magnitude, thereby overcoming the spring compression force. The selection of a spring and accompanying compression force is dependent upon the tank rupture pressure and obviously will be of a lower value. By overcoming the spring compression force, the ball 25 is raised off the seat 24, thereby permitting the flow of cryogenic fluid through the liner passage 19. This cryogenic fluid may be in the vapor state, liquid state, or a mixture of liquid and vapor, depending upon the location of the tube.

The tendency of the cryogenic fluid to freeze as initial flow occurs between the seat 24 and the ball 25 is reduced to a minimum by constructing the liner 18 of a material having a high thermal conductivity so as to maintain the temperature of the seat 24 above the freezing temperature of the cryogenic fluid.

The fluid will then pass through the restricted passages of the porous plug 32 and exhaust out of the tube outer portion 14 into the near vacuum conditions of the space environment 11. While passing through the porous plug, the fluid is said to be throttled, thereby undergoing a constant-enthalpy expansion process with a resulting drop of fluid temperature. In the instant application the expansion of the cryogenic fluid to pressures of zero or near zero lowers the temperature thereof below the freezing point. Consequently, cryogenic fluid in the liquid or liquid-vapor state freezes within the plug during the aforementioned constant-enthalpy expansion, thereby preventing loss of cryogenic fluid liquid by clogging the porous plug. Cryogenic fluid in the vapor state, however, freely flows through the porous plug, thereby effectively relieving the tank pressure. Thus, the instant invention automatically senses what state the cryogenic fluid is in and allows passage only of the vapor. When freezing within the porous plug occurs, or pressure in the tank is reduced to an acceptable value, the spring 26 urges the ball 25 against the seat 24, thereby again sealing the liner passage 19. The device may be reactivated or restored to operation by utilizing the natural heat conduction from the now relatively-speaking warmer tank 10 through the wall of the tube 13 to melt the frozen cryogenic fluid within the plug 32. If operational flexibility is desired, the heating element 33 may be activated by connecting the conductors 34 to an energy source (not shown) and providing a suitable on-off switch arrangement (not shown) therebetween.

A tank containing vaporized fluid may be effectively vented by placing several of the venting devices, according to the instant invention, in strategic locations on the tank. It is obvious, however, that no serious problems are so introduced because each venting device may be a self-contained operating unit requiring no external power connections. In addition to the large factor of reliability available because of the singleness of operative parts; to wit, the valve, the device can be made to be extremely small in size and have a light weight.

Obviously, many modifications and variations of the present invention are possible in the light of the above teachings. It is, therefore, to be understood that within the scope of the appended claims, the invention may be practiced other than as specifically described.

What is claimed is:

1. A vent for a container of cryogenic fluid comprising conduit means, one end of which is disposed within the container, valve means disposed in said conduit means for effecting admittance of the cryogenic fluid from the container into said conduit means in response to a predetermined magnitude of cryogenic fluid pressure impressed thereon, and porous means disposed within said conduit for providing constant-enthalpy expansion of the admitted cryogenic fluid, thereby effecting unobstructed passage of said cryogenic fluid admitted in a vapor state through said porous means and freezing of said cryogenic fluid admitted in a liquid or liquid-vapor state within said porous means.

2. A vent in accordance with claim 1 and including heating means for effecting melting of the frozen cryogenic fluid in said porous means.

3. A vent for a container of cryogenic fluid comprising conduit means, one end of which is disposed within the container, valve means disposed in said conduit means for effecting admittance of the cryogenic fluid from the container into said conduit means in response to a predetermined magnitude of cryogenic fluid pressure impressed thereon, and a porous metal plug disposed within said conduit for providing constant-enthalpy expansion of the admitted cryogenic fluid, thereby effecting unobstructed passage of said cryogenic fluid admitted in a vapor state through said porous metal plug and freezing of said cryogenic fluid admitted in a liquid or liquid-vapor state within said porous metal plug.

4. A vent in accordance with claim 3 and including heating means for effecting melting of the frozen cryogenic fluid in said porous metal plug.

5. A method of venting a container of cryogenic fluid in a mixed liquid and vapor state and under substantial internal pressure, comprising discharging a portion of said fluid along a predetermined discharge path and through a porous resistance element, and subjecting the flow of said fluid to constant-enthalpy expansion in its travel through said resistance element to effect unobstructed passage of fluid in the vapor state and freezing of fluid in the liquid state within said element to clog same and prevent further flow.

References Cited in the file of this patent

UNITED STATES PATENTS

| | | |
|---|---|---|
| 646,459 | Place | Apr. 3, 1900 |
| 1,835,699 | Edmonds | Dec. 8, 1931 |
| 2,743,079 | Sills | Apr. 24, 1956 |
| 3,021,683 | McInroy | Feb. 20, 1962 |